United States Patent
Pollitt et al.

(10) Patent No.: US 10,184,509 B2
(45) Date of Patent: Jan. 22, 2019

(54) COMPOSITE TENSION/COMPRESSION STRUT

(71) Applicant: CROMPTON TECHNOLOGY GROUP LIMITED, Solihull, West Midlands (GB)

(72) Inventors: William Pollitt, Kenilworth (GB); Ian Thomas Chase, Salisbury (GB)

(73) Assignee: CROMPTON TECHNOLOGY GROUP LIMITED, West Midlands (GB)

( * ) Notice: Subject to any disclaimer, the term of this patent is extended or adjusted under 35 U.S.C. 154(b) by 355 days.

(21) Appl. No.: 14/949,310

(22) Filed: Nov. 23, 2015

(65) Prior Publication Data
US 2016/0153489 A1    Jun. 2, 2016

(30) Foreign Application Priority Data
Nov. 28, 2014    (EP) .................................. 14275248

(51) Int. Cl.
*F16C 3/02*    (2006.01)
*B29C 53/58*    (2006.01)
*F16D 1/06*    (2006.01)

(52) U.S. Cl.
CPC ............ *F16C 3/026* (2013.01); *B29C 53/585* (2013.01); *F16D 1/06* (2013.01); *F16C 2326/06* (2013.01)

(58) Field of Classification Search
CPC ......... Y10T 403/7026; Y10T 403/7075; Y10T 29/49826; B29C 67/0044; B29D 99/0046; F16C 3/026; F16C 7/026; F16D 1/092; F16D 1/10; F16D 2001/103; B29L 2031/24; F16B 5/0225; F16B 5/025

USPC ............ 403/343, 359.1, 376; 464/181, 182; 411/417, 418; 29/428
See application file for complete search history.

(56) References Cited

U.S. PATENT DOCUMENTS

| | | | | |
|---|---|---|---|---|
| 1,465,148 A | * | 8/1923 | Rosenberg | F16B 25/0031 411/418 |
| 2,815,928 A | * | 12/1957 | Bodine, Jr. | E21B 6/00 175/323 |
| 3,062,568 A | * | 11/1962 | Andresen | E21B 17/042 285/333 |
| 3,413,020 A | * | 11/1968 | Johns | F16L 33/2073 285/251 |
| 3,734,547 A | * | 5/1973 | Kojima | F16L 19/086 285/357 |
| 4,211,589 A | * | 7/1980 | Fisher | F16C 3/026 156/172 |

(Continued)

OTHER PUBLICATIONS

European Search Report for application No. EP14275248.4; dated May 13, 2015, 4 pages.

*Primary Examiner* — Amber R Anderson
*Assistant Examiner* — Nahid Amiri
(74) *Attorney, Agent, or Firm* — Cantor Colburn LLP

(57) ABSTRACT

A composite filament-wound shaft with an end fitting mounted on an interface region on at least one end of said shaft, wherein in said interface region filaments of the filament-wound shaft are angled with respect to the shaft axis such that they follow a path with a radial component and have been cut so as to expose the ends of said filaments in said interface region; and wherein said end fitting comprises a helical thread engaging with said interface region. The helical threaded engagement provides excellent load transmission of axial forces and is therefore well suited to tension and compression elements. The joint provides a low cost and low weight interface.

9 Claims, 2 Drawing Sheets

(56) References Cited

U.S. PATENT DOCUMENTS

| | | | | |
|---|---|---|---|---|
| 4,410,204 A * | 10/1983 | Reimert | F16L 15/003 285/24 |
| 4,550,937 A * | 11/1985 | Duret | E21B 17/042 285/114 |
| 5,259,614 A * | 11/1993 | Greer | A63B 53/10 273/DIG. 23 |
| 5,318,374 A * | 6/1994 | Rumberger | F16B 4/006 403/277 |
| 5,520,422 A * | 5/1996 | Friedrich | F16L 9/12 285/296.1 |
| 6,300,851 B1 * | 10/2001 | Baur | H01F 7/081 335/128 |
| 6,317,918 B1 * | 11/2001 | Kagawa | B60S 1/0488 15/250.3 |
| 6,878,069 B2 * | 4/2005 | Swim, Jr. | F16B 35/041 470/10 |
| 6,892,929 B2 * | 5/2005 | Yablochnikov | B23K 20/06 228/115 |
| 7,874,925 B2 * | 1/2011 | Dewhirst | B29C 65/64 464/181 |
| 8,302,754 B2 * | 11/2012 | Yagi | F16D 1/092 192/101 |
| 9,643,264 B2 * | 5/2017 | Frota De Souza | B23C 5/10 |
| 2001/0001769 A1 * | 5/2001 | Kimoto | F16C 3/026 464/181 |
| 2004/0192449 A1 * | 9/2004 | Smith | F16C 3/03 464/162 |
| 2004/0200123 A1 * | 10/2004 | Whiting | A01K 87/00 43/18.5 |
| 2005/0180840 A1 * | 8/2005 | Brewer | F16L 15/006 411/417 |
| 2006/0258469 A1 | 11/2006 | Dewhirst | | |
| 2008/0012329 A1 | 1/2008 | Dewhirst | | |
| 2012/0060636 A1 | 3/2012 | Dewhirst | | |
| 2013/0118301 A1 * | 5/2013 | Gallant | F16C 7/026 74/581 |
| 2015/0284957 A1 * | 10/2015 | Ganis | E04C 3/36 403/376 |

\* cited by examiner

COMPOSITE TENSION/COMPRESSION STRUT

FOREIGN PRIORITY

This application claims priority to European Patent Application No. 14275248.8 filed Nov. 28, 2014, the entire contents of which is incorporated herein by reference.

TECHNICAL FIELD

This disclosure relates to transmission shaft joints for joining end fittings to composite transmission shafts, in particular tension/compression transmission shafts or struts.

BACKGROUND

Filament wound structures such as composite transmission shafts are typically formed by winding filaments such as carbon fibres around a mandrel in a helical fashion so as to build up a tube shaped shaft. The angle of the helical winding influences the properties of the shaft. For example, windings approaching 45 degrees have higher torsional properties and those higher than 45 degrees have greater properties in the hoop direction. About 45 degrees is generally optimal for torque transmission.

Creating regions that sustain bearing loads required for a tension/compression strut would be problematic with a purely composite solution, so it is desirable to be able to attach metallic ends to a shaft. Forces are then transmitted through such end fittings which are typically mechanically attached to the ends of the shaft.

It is desirable that the joint between the shaft and the end fittings be structurally efficient so as to minimise weight while ensuring good force transmission and good joint robustness.

One problem with attaching end fittings onto composite filament-wound shafts is ensuring that the load transfer between the end fittings and the shaft is distributed amongst all filament layers. The thickness of the shaft is typically built up from a large number of layers of helically wound filaments. Attaching an end fitting to the shaft by a simple mechanical press fit over the shaft would result in the end fitting interfacing only with the outermost plies. The load transfer between plies would then be reliant on the interlaminar shear strength of the laminate to distribute the load to adjacent plies, leading to a weaker component.

US 2012/0060636 A1 describes a clamping-type joint in which the composite fibres are trapped between a nut located inside the tube of composite and an external collar that surrounds the tube of composite. A threaded end fitting component can be used to move the nut and the collar closer together, thus clamping the shaft fibres therebetween.

US 2006/0258469 A1 describes a method of forming a composite shaft such that an internally splined end fitting can be axially press fit over the shaft with good torsional load transfer properties. US 2008/0012329 A1 describes a particularly advantageous spline profile for this joint.

SUMMARY

According to this disclosure, there is provided a composite filament-wound shaft with an end fitting mounted on an interface region on at least one end of said shaft, wherein in said interface region filaments of the filament-wound shaft are angled with respect to the shaft axis such that they follow a path with a radial component and have been cut so as to expose the ends of said filaments in said interface region; and wherein said end fitting comprises a helical thread engaging with said interface region.

The end fitting is typically metallic (although it could be formed from any suitable material) and typically has a cylindrical attachment portion on which the thread is provided and a flanged portion to which external components are attached so that the shaft may act as an actuator rod or other force transmission component. It will be appreciated that the joint described here may be used in a wide range of applications, wherever tension/compression elements, etc. may be used. Some example applications include aerospace applications such as piston rods, struts, control actuators, etc.

Mounting the end fitting to the composite shaft via a helical thread makes the joint more suitable for transmitting axial forces than a joint that is engaged via axial splines onto the interface region. This helical attachment thus forms a tension/compression joint that is more suitable for shafts that transmit tension and/or compression forces.

The angling of the filaments in the interface region followed by cutting or grinding to expose the filament ends ensures that all, or most layers of the helical plies of fibres that form the shaft are engaged with the end fitting, thus ensuring excellent load sharing of forces between the end fitting and the shaft. Distributing the applied forces across more fibres, in particular across more fibre plies of the shaft greatly increases the strength of the joint. During the mounting process, the helical thread is driven into the composite shaft, between the fibre ends, compressing the fibres and thus forming a very strong attachment. As more of the thread engages with the interface region the strength of the joint increases. The thread cuts into and removes material from the composite shaft. To maximise the efficiency of force transfer in the axial direction (i.e. for tension/compression), it is desirable to make the thread is perpendicular as possible to the shaft axis. However, this has the effect of increasing the amount of cutting required to fully screw the end fitting onto the shaft.

The joint is structurally efficient in terms of its strength to weight ratio. The fitting can be formed as a single piece, and can use less material (e.g. less metal) and less composite in the joint region compared with other joining techniques. This also reduces cost and is simple to manufacture and assemble.

The end fitting may further comprise one or more grooves across the helical thread that break the helical thread into a plurality of part-helices. In some preferred examples, the grooves may be axial grooves or they may be helical grooves. The grooves have the advantage of reducing the torque required to affix the end fitting. The grooves allow debris that is cut from the interface region by the threads to be accommodated within the grooves, thus either finding a path out of the joint completely, or at least not further obstructing or resisting the mounting process. Any number of such grooves may be used providing sufficient threaded engagement remains to keep the joint parts securely fixed together and to ensure effective load transfer across the joint. In some examples four axial grooves across the helical threads are provided, e.g. every 90 degrees around the shaft.

A multi-start thread may be used on the end fitting, i.e. one with multiple adjacent helices interleaved with one another. However, in some preferred examples the thread is a single-start thread. The multi-start thread may have advantages in reducing the number of turns required to mount the end fitting onto the shaft, but it also requires a reduction in the angle between the threads and the shaft axis (i.e. the threads must be less perpendicular to the shaft axis) which, as discussed before diverges from the ideal, perpendicular arrangement.

The thread preferably has a profile that comprises a cutting tooth portion arranged to cut into the interface region and a substantially flat land portion that frictionally engages with the interface region. As the thread forms a helix, an axial section through the thread will exhibit alternating teeth and lands.

The thread profile may further comprise at least one channel portion adjacent to the cutting tooth portion to accommodate debris produced during a mounting process. The channel portion may be provided between the tooth portion and the flat land portion. Where axial grooves are also formed across the thread, these channels will feed into the grooves, thus providing a route for debris to escape or collect during the mounting process.

The interface region of the shaft may comprise a ramp of hoop-wound fibres that increases in thickness in the axial direction of the shaft towards the end of the shaft, and helical-wound fibres wound over the ramp. The hoop-wound fibres can easily be wound so as to accurately build up the profile of the ramp at the desired gradient, forming a conical wedge shape with its thickest part at the edge of the shaft. During forming of the shaft, the hoop section may be formed on a mandrel first. The rest of the shaft is then formed using helical wound fibres as normal, but in the region of the ramp part, the fibres are redirected radially outwardly so as to splay outwards towards the end of the shaft. After the shaft has been built up to a desired thickness, the end (above the hoop-wound ramp) will be thicker than the middle of the shaft. This thicker section is then ground down to a similar diameter to the rest of the shaft. As the fibres in this region are not parallel to the shaft, the grinding (or more generally any material removal process) step exposes the ends of fibres from lots of different plies of the composite shaft. When the end fitting is attached to overlap this interface region, the end fitting becomes engaged with all of these plies and thus shares its load transmission between all of those plies rather than concentrating load on a smaller number of surface plies. Preferably the helical-wound fibres over the ramp have been cut or ground parallel to the axis of the shaft to expose the fibre ends and form the interface region.

According to another aspect of this disclosure, there is provided a method of mounting an end fitting onto a composite filament-wound shaft, the end fitting comprising a helical thread; the shaft comprising an interface region in which filaments of the filament-wound shaft are angled with respect to the shaft axis such that they follow a path with a radial component and have been cut so as to expose the ends of said filaments in said interface region; the method comprising screwing said end fitting onto said shaft.

All of the preferred features of the end fitting and shaft that have been described above naturally also apply to this aspect of the disclosure.

According to another aspect, this disclosure provides an end fitting for mounting onto a composite filament-wound shaft, said end fitting comprising an internal thread arranged to cut helically into an interface region on the end of said filament-wound shaft during mounting.

BRIEF DESCRIPTION OF DRAWINGS

One or more non-limiting examples will now be described, by way of example only, and with reference to the accompanying figures in which.

DETAILED DESCRIPTION

Composites can be made very structurally efficient (i.e. a high strength to weight ratio), however this efficiency is usually reduced in interfacing with metallic elements which may be required, e.g. for connection to other devices or equipment. A structurally efficient tension-compression joint has applications in struts, control linkages and rods.

Figure 1:
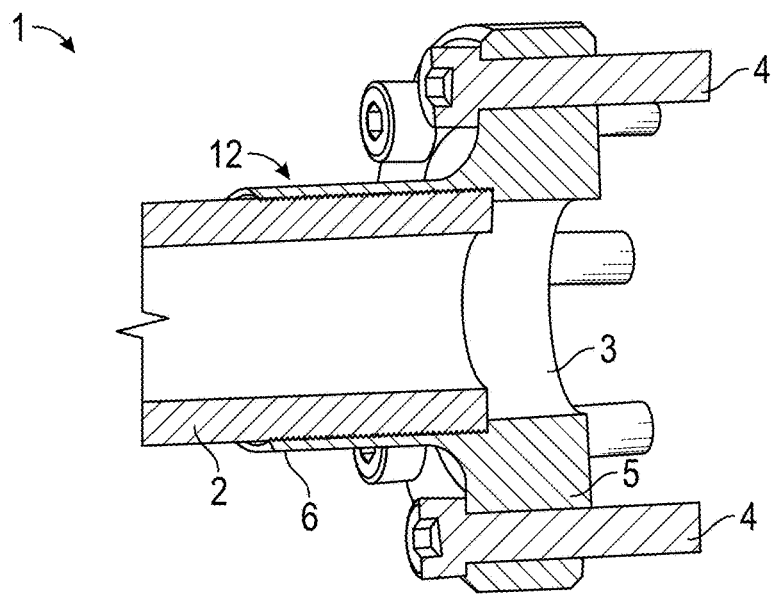
FIG. 1 illustrates an end fitting joined to a composite shaft.

FIG. 1 shows a tension-compression joint 1 comprising a composite shaft 2 with a metal end-fitting 3 mounted thereon. The end-fitting 3 may be connected to other equipment via bolts 4 through flange 5. End-fitting 3 also has a cylindrical attachment part 6 which is internally threaded with a helical thread and with an internal diameter closely matched to the outer diameter of the shaft 2. It will be appreciated that "closely matched" may mean exactly the same size, very slightly larger (to allow movement) or very slightly smaller (to create compression upon fitting). The exact choice of internal and external diameters will depend upon the materials used, the intended use of the shaft and the forces expected to be transmitted therethrough.

Figure 2:
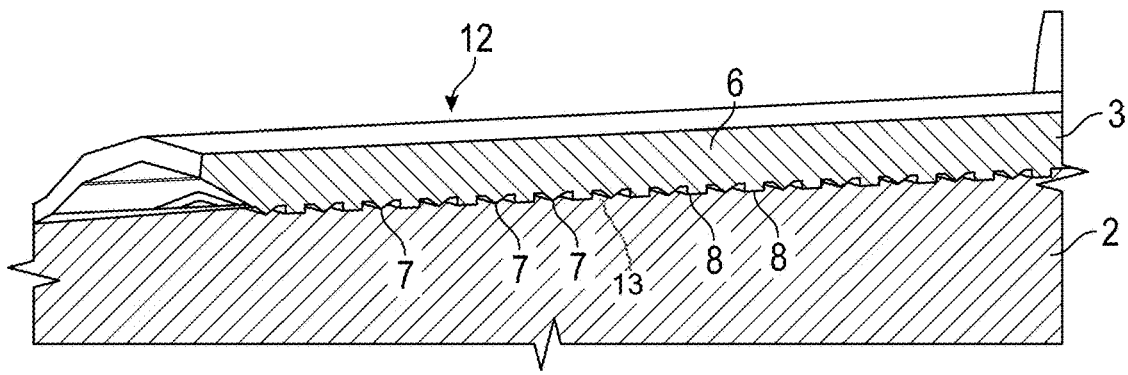
FIG. 2 shows the interface of the joint in more detail.

The detailed view of FIG. 2 shows that the thread profile is made up of teeth 7 and flat lands 8. The end-fitting 3 shown in FIG. 2 is a single-start thread so the multiple teeth 7 shown in FIG. 2 are in fact all part of the same helical thread. Similarly, all of the flat lands 8 are part of the same helical thread. The profile further comprises at least one channel portion 13 adjacent to the cutting tooth portion 7 to accommodate debris produced during a mounting process.

Figure 3:
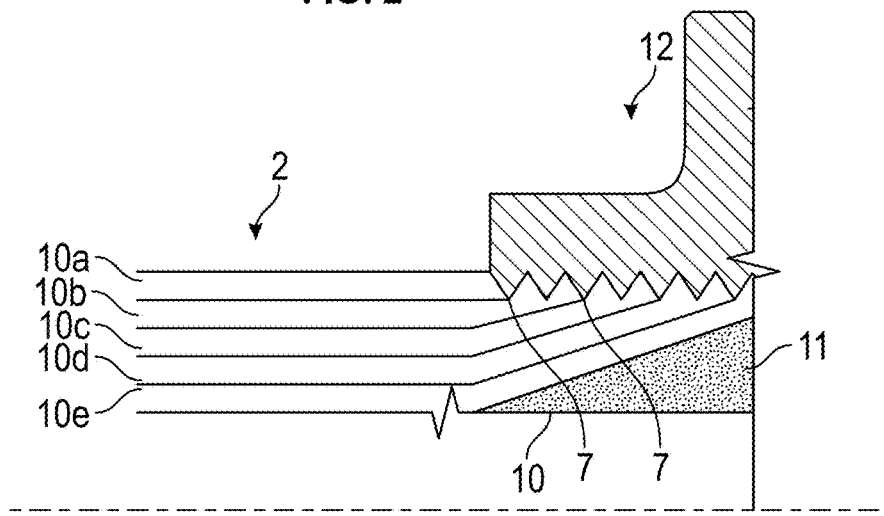
FIG. 3 illustrates a shaft construction.

FIG. 3 illustrates the construction of the shaft 2. FIG. 3 is somewhat schematic in nature as it shows the plies 10a-e much larger than in a real example. Also, the plies 10 in FIG. 3 do not illustrate that the individual filaments are helically wound, which would almost certainly be the case in real implementations.

The shaft 2 illustrated in FIG. 3 is made up of 5 plies 10 (individually labelled 10a-10e). At the end of the shaft 2, a conical ramp 11 has been formed from hoop-wound fibres with the ramp's thickness building up towards the end of the shaft 2 so that it is thickest at the end. The helical wound plies 10 are then wound on top of the ramp 11. As can be seen in FIG. 3, as the plies 10 pass over the top of the hoop wound ramp 11, they splay radially outwardly (i.e. the hoop 11 causes them to follow a path with a radial component rather than purely axial and circumferential components). The joint interface region 12 has been formed by grinding down the thicker portion of helical plies 10 over the ramp 11 so as to conform the thickness with the rest of the shaft (although conformity of thickness is not essential). This grinding process has led to exposure of the ends of the individual plies 10a-10e such that all of those plies 10a-10e interface with the threads 7 of end-fitting 3. As the threads of end-fitting 3 interface with all of the plies 10a-10e, forces are transmitted between the end-fitting 3 and the shaft 2 via all of the plies 10a-10e rather than only through surface plies 10a and possibly 10b (which would be the case in the absence of the ramp 11).

The threaded engagement of the shaft 2 and end-fitting 3 means that the threads provide excellent force transmission in the axial direction so that the joint is particularly suited to tension and compression force transmission. This means that the joint reacts the shear loading at the interface most effectively in the axial rather than the circumferential direction. The joint will still have an adequate transmission in the circumferential direction (e.g. for incidental torsional loads), but is more ideally suited to axial loads. Due to the thread, the joint will resist torsional loads in one sense (the tightening sense of the thread) more than the opposite sense (the loosening sense of the thread). The joint is also structurally efficient in that it achieves an excellent bond between the shaft 2 and end-fitting 3 with a relatively small quantity of metal, thus reducing weight and cost. The joint is also mechanically simple to manufacture and join in that it can be made as a single component.

Assembly of the joint is carried out by way of turning the end fitting 3 relative to the shaft 2 whilst allowing the end fitting 3 to move axially relative to the shaft 2. This may be improved further by forcing the end fitting 3 to move axially at the pitch of the thread, i.e. driving the end fitting 3 to move at an axial rate of one thread pitch per full rotation so that its driven axial movement exactly matches the rate that would be induced by the thread.

Figure 4:
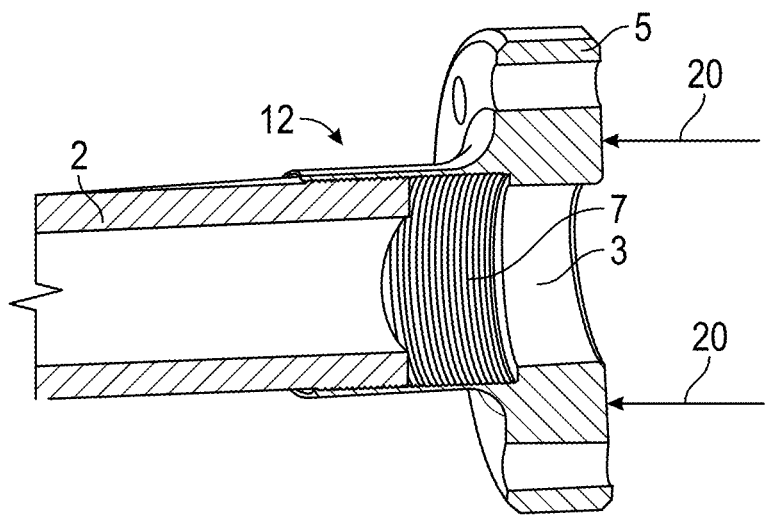
FIG. 4 illustrates an interface in the process of being joined.

FIG. 4 shows an end fitting 3 part way through mounting onto shaft 2. Arrows 20 indicate an axial driving force applied to the end fitting 3 so as to induce movement at a rate matching the natural movement rate of the thread, i.e. driving the end fitting at an axial rate of one thread pitch per full rotation around the shaft axis.

Figure 5:
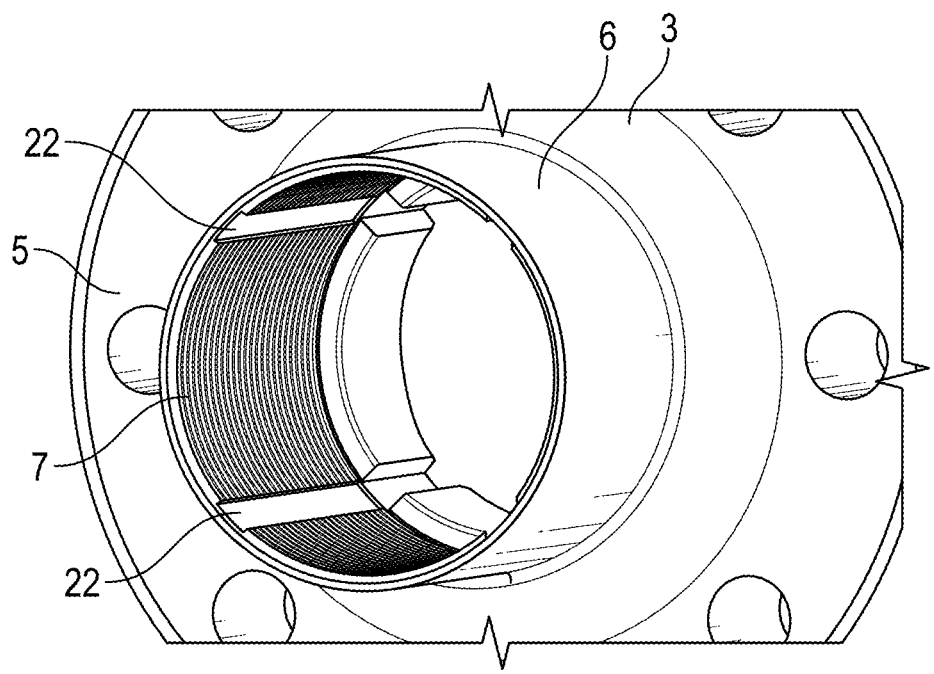
FIG. 5 shows an end fitting with axial grooves across the internal thread.

FIG. 5 shows an end fitting 3. The threads 7 are interrupted by axial grooves 22 that provide passages for material cuttings to be held or even to pass along the grooves 22 and out of the joint. Any number of axial grooves 22 may be provided, although four are illustrated in FIG. 5.

The invention claimed is:

1. The A composite filament-wound shaft with an end fitting mounted on an interface region on at least one end of said shaft,
    wherein in said interface region, filaments of the filament-wound shaft are angled with respect to a shaft axis such that the filaments follow a path with a radial component and have been cut so as to expose ends of said filaments in said interface region; and
    wherein said end fitting comprises a helical thread engaging with said interface region.

2. The shaft as claimed in claim 1, wherein said end fitting further comprises grooves across the helical thread that break the helical thread into a plurality of part-helices.

3. The shaft as claimed in claim 2, wherein said grooves are axial grooves or helical grooves.

4. The shaft as claimed in claim 2, wherein said end fitting comprises four axial grooves across the helical threads.

5. The shaft as claimed in claim 1, wherein the thread is a single-start thread.

6. The shaft as claimed in claim 1, wherein said thread has a profile that comprises a cutting tooth portion arranged to cut into said interface region and a substantially flat land portion that frictionally engages with said interface region.

7. The shaft as claimed in claim 6, wherein said profile further comprises at least one channel portion adjacent to said cutting tooth portion to accommodate debris produced during a mounting process.

8. The shaft as claimed in claim 1, wherein the interface region of the shaft comprises a ramp of hoop-wound fibres that increases in thickness in the axial direction of the shaft towards the end of the shaft, and helical-wound fibres wound over said ramp.

9. The shaft as claimed in claim 8, wherein said helical-wound fibres over said ramp have been cut or ground parallel to the axis of the shaft to expose fibre ends and form said interface region.

* * * * *